(12) United States Patent
Negishi et al.

(10) Patent No.: US 12,025,235 B2
(45) Date of Patent: Jul. 2, 2024

(54) PRESSURE-REDUCING VALVE AND METHOD FOR MANUFACTURING SAME

(71) Applicant: NIPPON THERMOSTAT CO., LTD., Kiyose (JP)

(72) Inventors: Isao Negishi, Kiyose (JP); Katsuyuki Hishinuma, Kiyose (JP); Fumihiro Ito, Kiyose (JP)

(73) Assignee: Nippon Thermostat Co., Ltd., Tokyo (JP)

(*) Notice: Subject to any disclaimer, the term of this patent is extended or adjusted under 35 U.S.C. 154(b) by 71 days.

(21) Appl. No.: 18/015,819

(22) PCT Filed: Aug. 6, 2021

(86) PCT No.: PCT/JP2021/029315
§ 371 (c)(1),
(2) Date: Jan. 12, 2023

(87) PCT Pub. No.: WO2022/085271
PCT Pub. Date: Apr. 28, 2022

(65) Prior Publication Data
US 2023/0296182 A1    Sep. 21, 2023

(30) Foreign Application Priority Data
Oct. 20, 2020   (JP) .................................. 2020-175761

(51) Int. Cl.
*F16K 1/44*   (2006.01)
*F16K 1/48*   (2006.01)
(Continued)

(52) U.S. Cl.
CPC ................ *F16K 3/267* (2013.01); *F16K 1/48* (2013.01); *F16K 17/0466* (2013.01)

(58) Field of Classification Search
CPC ........ F16K 3/267; F16K 1/48; F16K 17/0466; F16K 17/30; F16K 17/02; F16K 17/00
See application file for complete search history.

(56) References Cited

U.S. PATENT DOCUMENTS

| 3,463,185 | A  | * | 8/1969 | Oliver ................... F16K 15/025 |
|           |    |   |        | 137/516.29 |
| 10,260,656 | B2 |   | 4/2019 | Ito et al. |
| 2018/0128392 | A1 | * | 5/2018 | Wang ..................... F16K 15/147 |

FOREIGN PATENT DOCUMENTS

| JP | 2000-320723 A | 11/2000 |
| JP | 2001-330171 A | 11/2001 |
| JP | 2017-215025 A | 12/2017 |

* cited by examiner

*Primary Examiner* — P. Macade Nichols
(74) *Attorney, Agent, or Firm* — Carrier, Shende & Associates P.C.; Joseph P. Carrier; Fulchand P. Shende

(57) ABSTRACT

A pressure-reducing valve 1 includes a tubular valve body 3 movably accommodated in a housing 2, a valve seat 4 fixed inside the housing 2, and an urging member 5 that urges the valve body 3 in a direction separating from the valve seat 4. The valve seat 4 includes an annular elastic member (O-ring 42) capable of abutting against the valve body 3, an annular portion (inner ring portion 41b) that covers an outer periphery of the elastic member, an inner peripheral portion 43b disposed on an inner periphery of the elastic member, a connecting portion (closing plate portion 43a) that connects the annular portion and the inner peripheral portion 43b, and a detachment prevention portion provided in at least one of the inner peripheral portion 43b and the annular portion on a valve body side to prevent the elastic member from detaching from the annular portion.

6 Claims, 3 Drawing Sheets

(51) Int. Cl.
*F16K 3/26* (2006.01)
*F16K 17/04* (2006.01)

PRESSURE-REDUCING VALVE AND METHOD FOR MANUFACTURING SAME

TECHNICAL FIELD

The present invention relates to a pressure-reducing valve capable of adjusting a pressure on a downstream side and a method for manufacturing the same.

BACKGROUND ART

Conventionally, a pressure-reducing valve has been known that reduces an opening degree when a pressure on a downstream side increases to reduce the pressure on the downstream side (see, for example, Japanese Patent Application Laid-Open No. 2000-320723).

SUMMARY OF INVENTION

Technical Problem

In the pressure-reducing valve of Japanese Patent Application Laid-Open No. 2000-320723, a valve seat is supported by a support metal fitting. In the pressure-reducing valve of Japanese Patent Application Laid-Open No. 2000-320723, a valve seat portion is made of rubber, the support metal fitting is a metal plate-shaped member formed by pressing, and the rubber portion is integrated with the plate-shaped member by baking. However, when the valve seat member is made of a rubber-baked product, a large number of labors such as application of an adhesive, rubber baking, and burr treatment are required, which increases the manufacturing cost.

In view of the above points, an object of the present invention is to provide a pressure-reducing valve and a method for manufacturing the same, which can be manufactured at a lower cost than that in the related art.

Solution to Problem

[1] In order to achieve the above object, the pressure-reducing valve of the present invention (for example, a pressure-reducing valve 1 of an embodiment and the same hereafter) includes a housing (for example, a housing 2 of an embodiment and the same hereafter) that has an inlet and an outlet, and is capable of allowing a fluid flowing in from the inlet to flow out from the outlet through an inside;

a tubular valve body (for example, a valve body 3 of an embodiment and the same hereafter) that is movably accommodated in the housing;

a valve seat (for example, a valve seat 4 of an embodiment and the same hereafter) that is fixed inside the housing; and an urging member (for example, an urging member 5 of an embodiment and the same hereafter) that urges the valve body in a direction to be separated from the valve seat, in which the flow of the fluid in the housing is capable of being blocked by causing the valve body to abut against the valve seat against an urging force of the urging member by increasing a pressure of the fluid at the outlet, the valve seat includes an annular elastic member (for example, an O-ring 42 of an embodiment and the same hereafter) that is made of an elastic body capable of abutting against the valve body, an annular portion (for example, an inner ring portion 41b of an embodiment and the same hereafter) that covers an outer periphery of the elastic member, an inner peripheral portion (for example, an inner peripheral portion 43b of an embodiment and the same hereafter) that is configured of a separate body from the annular portion and is disposed on an inner periphery of the elastic member, a connecting portion that connects the annular portion and the inner peripheral portion (for example, a structural portion for fixing a closing plate portion 43a that is ultrasonically welded to the inner ring portion 41b and an insertion portion of an inner peripheral portion 43b at a top portion 41e of the inner ring portion 41b in FIG. 3 of an embodiment with a C-ring 43d, and the same hereafter), and a detachment prevention portion (for example, a first detachment prevention portion 43c, a second detachment prevention portion 41f of the inner ring portion 41b, and an annular support portion 73 of an embodiment, and the same hereafter) that is provided in the inner peripheral portion on a valve body side to prevent the elastic member from detaching from the annular portion.

According to the present invention, since the annular elastic member is sandwiched between the annular portion configured as separate bodies and the inner peripheral portion, and the annular portion and the inner peripheral portion are connected by the connecting portion, the valve seat is not necessary to be a rubber-baked product, a large number of labors such as application of an adhesive, rubber baking, and burr treatment are not required, and the manufacturing cost can be kept low.

[2] Further, in the present invention, it is preferable that the detachment prevention portion is formed integrally with at least the inner peripheral portion, and the connecting portion connects the annular portion and the inner peripheral portion on a side to be separated from the valve body.

Here, as a comparative example, in a case where the annular portion and the inner peripheral portion are integrally molded via a coupling member (for example, a closing plate portion of an embodiment and the same hereafter), and the detachment prevention portion is ultrasonically welded to a lower end of the inner peripheral portion, influence of distortion of the detachment prevention portion and the inner peripheral portion on the valve body side due to the ultrasonic welding is likely to come out to the abutting portion of the valve body 3 of the elastic member, and in the worst case, there is a concern that the valve body is not able to prevent the flow of fluid.

In this case, as in the present invention described above, if the inner peripheral portion and the annular portion integrally provided with the detachment prevention portion are fixed on the side that is separated from the valve body, the influence of the distortion due to the welding does not affect the abutting portion of the elastic member against the valve body, and in a case where the pressure on the downstream side rises to a predetermined value or more, the valve body appropriately abuts against the elastic member to appropriately block the flow of the fluid flowing in a housing.

[3] Further, in the present invention, the valve seat may include a closing plate portion (for example, the closing plate portion 43a of an embodiment and the same hereafter) that closes a side of the annular portion, which is separated from the valve body, the inner peripheral portion may be molded integrally with the closing plate portion, and the closing plate portion may be fixed by welding on the side of the annular portion, which is separated from the valve body.

[4, 5] Further, in the present invention, it is preferable that the annular portion is formed integrally with a top portion closing a side to be separated from the valve body, and at an end portion of the annular portion on the valve body side, a detachment prevention portion (for example, a second detachment prevention portion according to an embodiment and the same hereafter) configured of a separate member from the annular portion is disposed.

According to the present invention, the elastic member can be easily inserted into the annular portion from the valve body side without interference of the detachment prevention portion on the annular portion side, and the pressure-reducing valve can be easily assembled.

[6] Further, a method for manufacturing a pressure-reducing valve according to the present invention including a housing that has an inlet and an outlet, and is capable of allowing a fluid flowing in from the inlet to flow out from the outlet through an inside, a tubular valve body that is movably accommodated in the housing, a valve seat that is fixed inside the housing, and an urging member that urges the valve body in a direction to be separated from the valve seat, in which the flow of the fluid in the housing is capable of being blocked by causing the valve body to abut against the valve seat against an urging force of the urging member by increasing a pressure of the fluid at the outlet, the valve seat includes an annular elastic member that is made of an elastic body capable of abutting against the valve body, an annular portion that covers an outer periphery of the elastic member, an inner peripheral portion that is disposed on an inner periphery of the elastic member, and a detachment prevention portion that is provided in the inner peripheral portion on a valve body side to prevent the elastic member from detaching from the annular portion, the method for manufacturing a pressure-reducing valve includes a connecting step of connecting the annular portion and the inner peripheral portion by a connecting portion.

According to the present invention, since the annular elastic member is sandwiched between the annular portion configured as separate bodies and the inner peripheral portion, and the annular portion and the inner peripheral portion are connected by the connecting portion, the valve seat is not necessary to be a rubber-baked product, a large number of labors such as application of an adhesive, rubber baking, and burr treatment are not required, and the manufacturing cost can be kept low.

DESCRIPTION OF EMBODIMENTS

Figure 1:
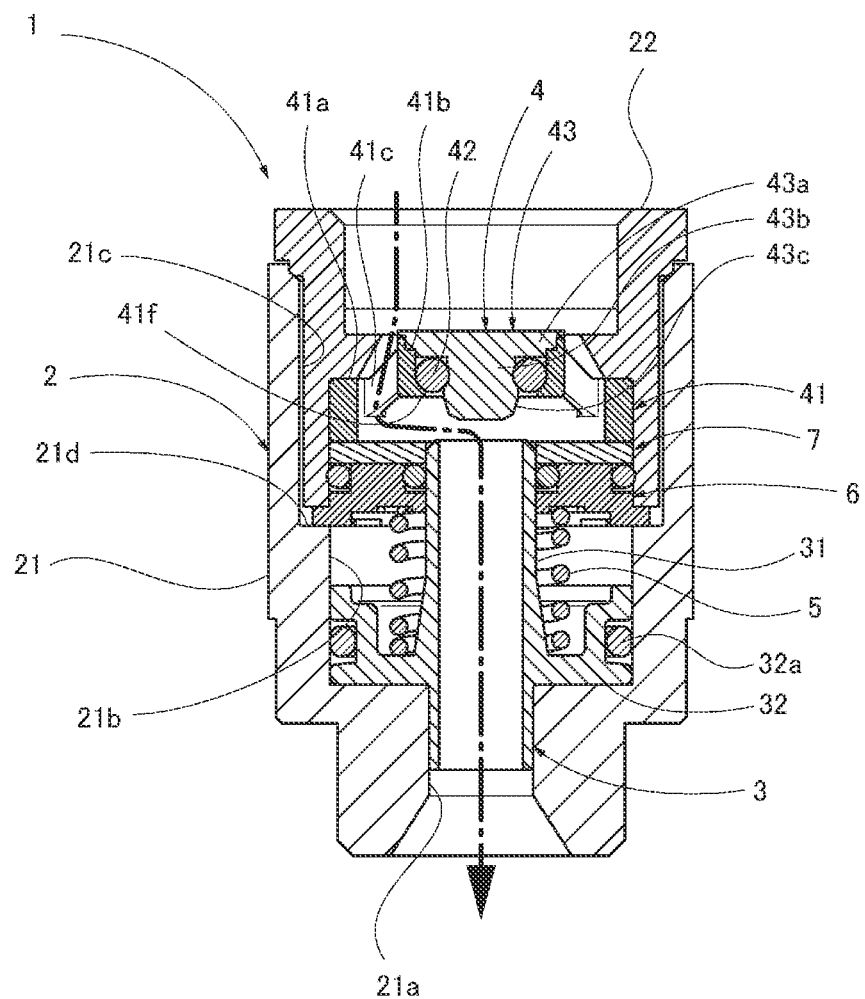
FIG. 1 is an explanatory view illustrating an embodiment of a pressure-reducing valve according to the present invention.
Figure 2:
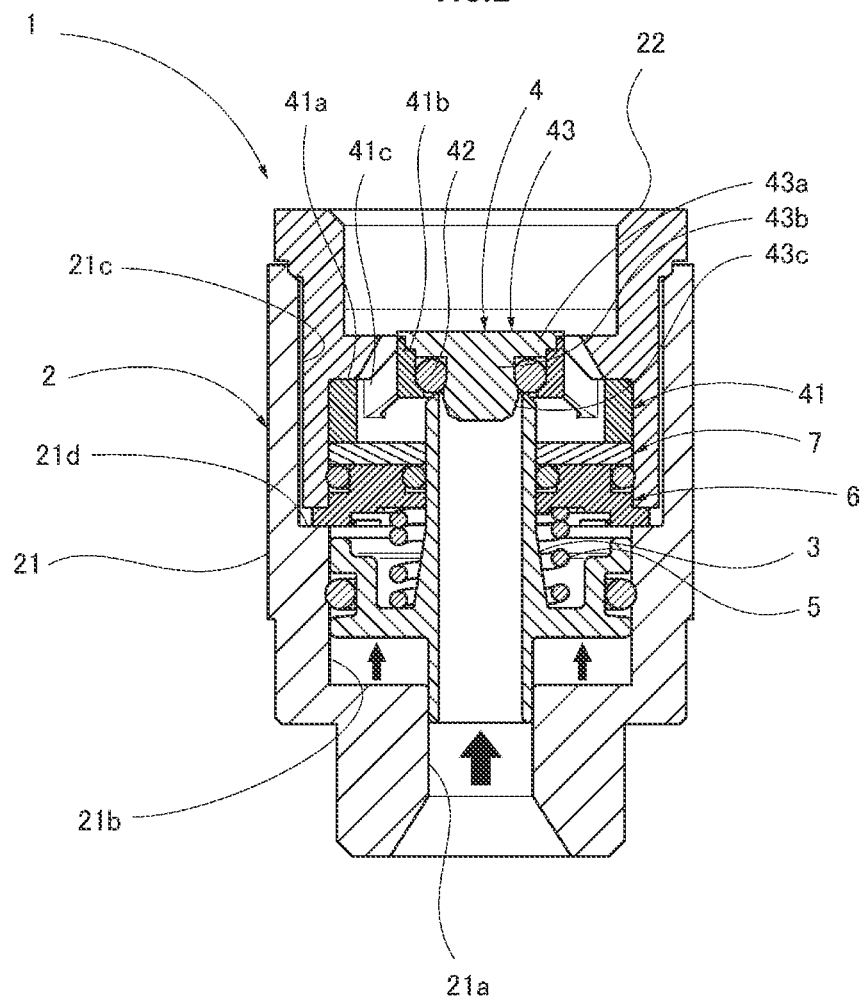
FIG. 2 is an explanatory view illustrating a valve closed state of the pressure-reducing valve according to the present embodiment.

With reference to FIGS. 1 and 2, a pressure-reducing valve 1 of an embodiment of the present invention includes a cylindrical housing 2 that is made of a synthetic resin, a cylindrical valve body 3 that is slidably disposed in the housing 2 in a direction of a central axis and is made of a synthetic resin, a valve seat 4 that is capable of liquid-tightly closing a space with the valve body 3 by contacting the valve body 3, and an urging member 5 (for example, a coil spring) that urges the valve body 3 in a direction to be separated from the valve seat 4.

The housing 2 is configured of a bottomed tubular housing main body 21 having a top portion that is open and a through-hole 21a that is at a bottom portion, and a cap 22 that is attached to the opening of the top portion of the housing main body 21 and prevents the valve seat 4 accommodated in the housing 2 from the opening from detaching. The opening is formed in the cap 22, and a fluid can freely move up and down in the drawing of the cap 22 through the opening. A small diameter portion 21b and a large diameter portion 21c are formed on an inner peripheral surface of the housing main body 21 from the bottom side, and a step portion 21d is formed between the small diameter portion 21b and the large diameter portion 21c. The cap 22 is ultrasonically welded to the housing main body 21.

A spring seat 6 abutting against one end of the urging member 5 abuts against the step portion 21d. A donut-shaped holder 7 is disposed above the spring seat 6 in the drawing.

The valve body 3 is configured of a tubular portion 31 having a circular cross-section, an overhanging portion 32 protruding outward in a radial direction from a central portion of the tubular portion 31, and an annular sealing member 32a that is fitted into a fitting groove provided on an outer peripheral edge of the overhanging portion 32 and is an elastic body for liquid-tightly closing between the small diameter portion 21b of the housing 2 and the overhanging portion 32.

The valve seat 4 is configured of a valve seat frame body 41 made of synthetic resin, an O-ring 42 as an elastic member, and a fixing member 43 made of synthetic resin. The valve seat frame body 41 is configured of an annular outer ring portion 41a, an inner ring portion 41b disposed inside the outer ring portion 41a with a gap, and a bridge portion 41c connecting the outer ring portion 41a and the inner ring portion 41b with a gap.

The spring seat 6, the holder 7, and the outer ring portion 41a are disposed in this order between the step portion 21d and the cap 22 from the step portion 21d side, and are sandwiched and fixed between the step portion 21d and the cap 22.

The fixing member 43 includes a closing plate portion 43a that closes the upper edge of the inner ring portion 41b, an inner peripheral portion 43b that hangs down from the center of the closing plate portion 43a and passes through a hole at the center of the O-ring 42, and extends therefrom, and a first detachment prevention portion 43c that is provided at a lower end of the inner peripheral portion 43b and has a diameter larger than that of the inner peripheral portion 43b so as to prevent the O-ring 42 from detaching from the inner ring portion 41b. The first detachment prevention portion 43c has a shape that is tapered toward the lower side in the drawing so that the O-ring 42 can be easily mounted on the inner peripheral portion 43b.

The closing plate portion 43a is ultrasonically welded to the upper edge of the inner ring portion 41b (connecting step). The configuration in which the closing plate portion 43a and the closing plate portion 43a are ultrasonically welded to the inner ring portion 41b corresponds to the connecting portion in the present embodiment. The connecting step of connecting the closing plate portion 43a and the inner ring portion 41b is not limited to ultrasonic welding, and may be, for example, laser welding or vibration welding. Further, a connecting method other than welding may be performed, for example, welding, bonding, screwing, or sandwiching.

The O-ring 42 is disposed so as to be in contact with and along the inner peripheral surface of the inner ring portion 41b. At the lower end of the inner ring portion 41b, a second detachment prevention portion 41f that protrudes inward in the radial direction to prevent the O-ring 42 from detaching is provided.

Next, an operation of the pressure-reducing valve 1 of the present embodiment will be described. In the pressure-reducing valve 1 of the present embodiment, as illustrated by one-dotted chain line in FIG. 1, a fluid (for example, cooling water, oil, or the like) passes through the pressure-reducing valve 1 from the upper part to the lower part of the drawing. A force that is pushed upward in the drawing by the pressure on the downstream side acts on the valve body 3. Then, when the pressure on the downstream side downward in the drawing increases, the valve body 3 moves upward in the drawing against the urging force of the urging member 5, and a pressure loss corresponding to a size between the valve body 3 and the valve seat 4 occurs, the pressure on the lower side in the drawing decreases, and a flow rate of the fluid flowing in the pressure-reducing valve 1 decreases. The valve body 3 stands still at a position where the force pushed up by the pressure on the downstream side downward in the drawing and the pushing-down force of the urging member 5 are balanced. When the pressure downward in the drawing exceeds a predetermined value, as illustrated in FIG. 2, the upper end edge of the valve body 3 abuts against the O-ring 42, and the flow of the fluid in the pressure-reducing valve 1 is prevented.

According to the pressure-reducing valve 1 of the present embodiment, since the O-ring 42 as the annular elastic member is sandwiched between the inner ring portion 41b as the annular portion configured as a separate body and the inner peripheral portion 43b, and the inner ring portion 41b and the inner peripheral portion 43b are connected via the closing plate portion 43a, the valve seat 4 is not necessary to be a rubber-baked product, a large number of labors such as application of an adhesive, rubber baking, and burr treatment are not required, and the manufacturing cost can be kept low.

Further, the closing plate portion 43a including the first detachment prevention portion 43c and the upper edge of the inner ring portion 41b are welded together. Therefore, it is possible to prevent the influence of the distortion of the inner ring portion 41b and the closing plate portion 43a due to the welding from appearing on the abutting portion of the O-ring 42 as the elastic member against the valve body 3. As a comparative example, in a case where the inner ring portion 41b, the closing plate portion 43a, and the inner peripheral portion 43b are molded integrally, and the first detachment prevention portion 43c is welded to the lower end of the inner peripheral portion 43b, there is a concern that the influence of the distortion of the first detachment prevention portion 43c and the inner peripheral portion 43b on the valve body 3 side by ultrasonic welding is likely to be exerted in the abutting portion of the O-ring 42 as the elastic member against the valve body 3, and the flow of fluid cannot be prevented by the valve body 3. Here, integrally molding is defined as forming the resin by being flowed into a mold together.

In the present embodiment, the housing 2, the valve body 3, the valve seat frame body 41, the fixing member 43, the spring seat 6, and the holder 7 are described as being made of synthetic resin, but the pressure-reducing valve of the present invention is not limited to synthetic resin, and other materials such as metal and castings can be used to similarly exhibit the effects of the present invention.

Further, in the present embodiment, as the detachment prevention portion, the one including both the first detachment prevention portion 43c provided in the inner peripheral portion 43b and the second detachment prevention portion 41f provided in the inner ring portion 41b is described. As in the present embodiment, in a case where the elastic member is the O-ring 42 having the circular cross-section, it is possible to reliably prevent the O-ring 42 from detaching while ensuring the sealing property when the valve body 3 abuts against the O-ring 42 by providing the detachment prevention portions (43c and 41f) on both the inner peripheral side and the outer peripheral side. Further, the surfaces of both the detachment prevention portions (43c and 41O that press the O-ring 42 have the tapered shape. Therefore, the O-ring 42 can be prevented from detaching more reliably. However, in the detachment prevention portion of the present invention, the elastic member does not necessarily have the circular cross-section, and may have, for example, a quadrangular cross-section. In this case, at least one of the first detachment prevention portion 43c and the second detachment prevention portion 41f may be provided. This also makes it possible to achieve the effects of the present invention that the manufacturing cost can be suppressed to a low level.

Figure 3:
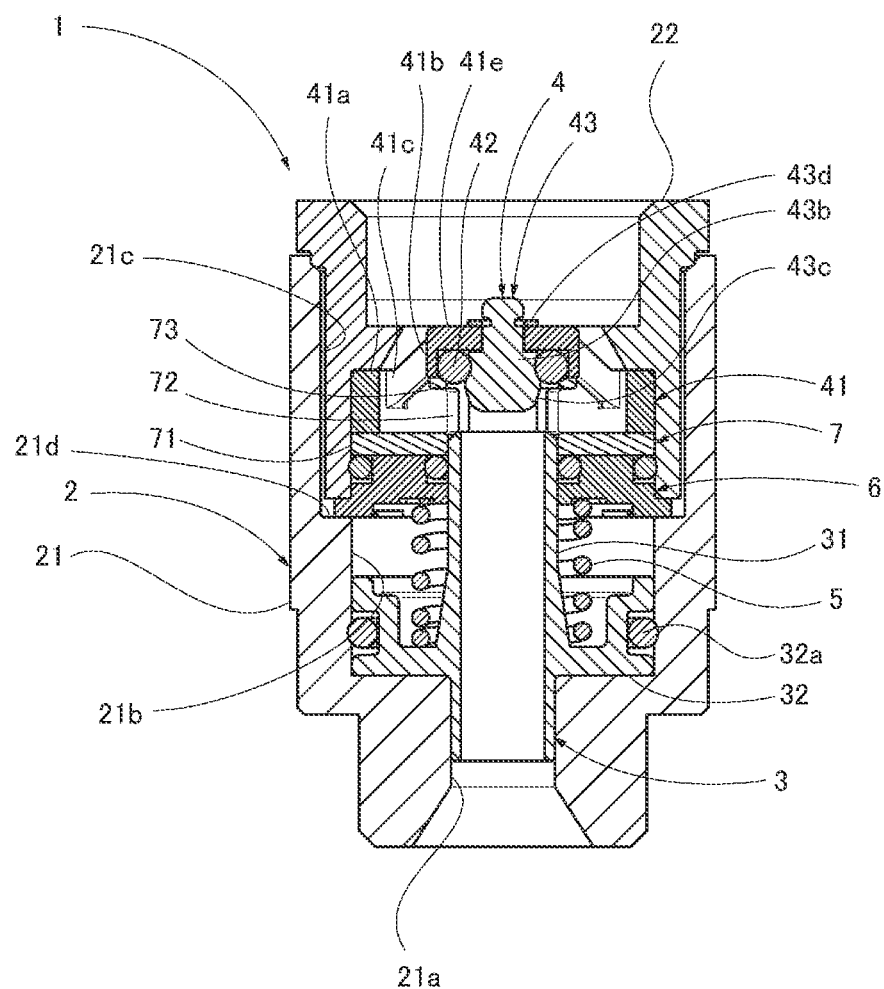
FIG. 3 is an explanatory view illustrating another embodiment of the pressure-reducing valve according to the present invention.

FIG. 3 illustrates a pressure-reducing valve 1 according to another embodiment of the present invention. The pressure-reducing valve 1 of the embodiment of FIG. 3 has the same configuration as that of FIG. 1 except that the configuration of the valve seat 4 is different therefrom, and the same reference numerals are given and the description thereof will be omitted.

The valve seat 4 of the pressure-reducing valve 1 in FIG. 3 is provided with a top portion 41e so as to close the upper portion of the inner ring portion 41b in the drawing, and the top portion 41e is provided with a through-hole. The inner peripheral portion 43b in FIG. 3 includes an insertion portion inserted into the through-hole of the top portion 41e of the inner ring portion 41b, and the C-ring 43d is fitted into an annular groove provided at an upper end portion of the insertion portion protruding above the top portion 41e, and thereby the inner peripheral portion 43b is connected to the top portion of the inner ring portion 41b (connecting step). In the embodiment of FIG. 3, the top portion 41e of the inner ring portion 41b, the insertion portion of the inner peripheral portion 43b, and the C-ring 43d correspond to the connecting portion of the present invention.

The holder 7 is provided with an annular plate portion 71 that is sandwiched and fixed between the spring seat 6 and the outer ring portion 41a, a plurality of leg portions 72 extending toward the O-ring 42 such that the vertical movement of the valve body 3 in the drawing is not interfered from the annular plate portion 71, and an annular support portion 73 that is connected to a tip end of the leg portion 72 and presses the outer peripheral edge of the O-ring 42 to prevent the O-ring 42 from detaching from the inner ring portion 41b. The annular support portion 73 serves as the second detachment prevention portion 41f provided at the lower end of the inner ring portion 41b of the embodiment of FIG. 1. In the pressure-reducing valve 1 of the embodiment of FIG. 3, the valve seat 4 and the holder 7 constitute the valve seat of the present invention.

Also in the pressure-reducing valve 1 of another embodiment of FIG. 3, similarly to the pressure-reducing valve 1 of FIG. 1, since the O-ring 42 as the annular elastic member is sandwiched between the inner ring portion 41b as the annular portion configured as a separate body and the inner peripheral portion 43b, and the inner ring portion 41b and the inner peripheral portion 43b are connected via the closing plate portion 43a, the valve seat 4 is not necessary to be a rubber-baked product, a large number of labors such as application of an adhesive, rubber baking, and burr treatment are not required, and the manufacturing cost can be kept low.

Here, as a comparative example, in a case where the inner ring portion 41b, the closing plate portion 43a, and the inner peripheral portion 43b are molded integrally, and the first detachment prevention portion 43c is ultrasonically welded to the lower end of the inner peripheral portion 43b, the influence of the distortion of the first detachment prevention portion 43c and the inner peripheral portion 43b on the valve body 3 side by the ultrasonic welding is likely to be exerted in the abutting portion of the O-ring 42 as the elastic member against the valve body 3, and in the worst case, there is a concern that the flow of the fluid cannot be prevented by the valve body 3. However, in another embodiment of FIG. 3, the inner peripheral portion 43b provided with the first detachment prevention portion 43c and the closing plate portion 43a are fixed by the C-ring 43d. Therefore, the influence of the distortion due to the ultrasonic welding does not affect the abutting portion of the O-ring 42 as the elastic member against the valve body 3, and the valve body 3 appropriately abuts against the O-ring 42 to block the flow of the fluid.

Here, in a case where the inner ring portion 41b and the top portion 41e are molded integrally, if the second detachment prevention portion 41f is also molded integrally with the inner ring portion 41b, the O-ring 42 as the elastic member is difficult to insert into the inner ring portion 41b. Therefore, in the embodiment of FIG. 3, the annular support portion 73 functions as the second detachment prevention portion 41f via the leg portion 72 extending from the annular plate portion 71 of the holder 7 toward the O-ring 42. As a result, the inner ring portion 41b and the annular support portion 73 as the detachment prevention portion are separate members, and the O-ring 42 can be easily inserted into the inner ring portion 41b.

In the description of the embodiment of FIG. 3, although description is made in which the closing plate portion 43a and the inner peripheral portion 43b are fixed by the C-ring, in the pressure-reducing valve of the present invention, the closing plate portion 43a and the inner peripheral portion 43b may be fixed by welding. In this manner as well, it is possible to obtain the effects of the present invention that the manufacturing cost can be suppressed and the valve body 3 and the O-ring 42 as the elastic member can be appropriately brought into abut against each other to close the valve.

Further, in the embodiment of FIG. 3, although description is made in which the housing 2, the valve body 3, the valve seat frame body 41, the fixing member 43, the spring seat 6, and the holder 7 are made of synthetic resin, the pressure-reducing valve of the present invention is not limited to the one made of synthetic resin, and the effects of the present invention can be similarly achieved by using other materials such as metal and casting.

In addition, in the embodiment of FIG. 3, description is made in which the detachment prevention portion includes both the first detachment prevention portion 43c provided in the inner peripheral portion 43b and the annular support portion 73. However, the detachment prevention portion of the present invention may be provided with at least one of the first detachment prevention portion 43c and the annular support portion 73. This also makes it possible to achieve the effects of the present invention that the manufacturing cost can be suppressed to a low level.

DESCRIPTION OF REFERENCE NUMERALS

1: pressure-reducing valve
2: housing
21: housing main body
21a: through-hole
21b: small diameter portion
21c: large diameter portion
21d: step portion
22: cap
3: valve body
31: tubular portion
32: overhanging portion
32a: sealing member
4: valve seat
41: valve seat frame body
41a: outer ring portion
41b: inner ring portion
41c: bridge portion
41e: top portion
41f: second detachment prevention portion
42: O-ring
43: fixing member
43a: closing plate portion
43b: inner peripheral portion
43c: first detachment prevention portion
43d: C-ring
5: urging member
6: spring seat
7: holder
71: annular plate portion
72: leg portion
73: annular support portion

The invention claimed is:

1. A pressure-reducing valve comprising:
a housing that has an inlet and an outlet, and is capable of allowing a fluid flowing in from the inlet to flow out from the outlet through an inside;
a tubular valve body that is movably accommodated in the housing;
a valve seat that is fixed inside the housing; and
an urging member that urges the valve body in a direction to be separated from the valve seat,
wherein the flow of the fluid in the housing is capable of being blocked by causing the valve body to abut against the valve seat against an urging force of the urging member by increasing a pressure of the fluid at the outlet,
the valve seat includes
an annular elastic member that is capable of abutting against the valve body, an annular portion that covers an outer periphery of the elastic member,
an inner peripheral portion that is configured of a separate body from the annular portion and is disposed on an inner periphery of the elastic member,
a connecting portion that connects the annular portion and the inner peripheral portion, and
a detachment prevention portion that is disposed in at least one of the inner peripheral portion and the annular portion on a valve body side to prevent the elastic member from detaching from the annular portion.

2. The pressure-reducing valve according to claim 1,
wherein the detachment prevention portion is formed integrally with at least the inner peripheral portion, and
the connecting portion connects the annular portion and the inner peripheral portion on a side to be separated from the valve body.

3. The pressure-reducing valve according to claim 2,
wherein the valve seat includes a closing plate portion that closes a side of the annular portion, which is separated from the valve body,
the inner peripheral portion is molded integrally with the closing plate portion, and
the closing plate portion is fixed by welding on the side of the annular portion, which is separated from the valve body.

4. The pressure-reducing valve according to claim 1,
wherein the annular portion is formed integrally with a top portion closing a side to be separated from the valve body, and
at an end portion of the annular portion on the valve body side, a detachment prevention portion configured of a separate member from the annular portion is disposed.

5. The pressure-reducing valve according to claim 2,
wherein the annular portion is formed integrally with a top portion closing a side to be separated from the valve body, and
at an end portion of the annular portion on the valve body side, a detachment prevention portion configured of a separate member from the annular portion is disposed.

6. A method for manufacturing a pressure-reducing valve including
a housing that has an inlet and an outlet, and is capable of allowing a fluid flowing in from the inlet to flow out from the outlet through an inside,
a tubular valve body that is movably accommodated in the housing,
a valve seat that is fixed inside the housing, and
an urging member that urges the valve body in a direction to be separated from the valve seat,
wherein the flow of the fluid in the housing is capable of being blocked by causing the valve body to abut against the valve seat against an urging force of the urging member by increasing a pressure of the fluid at the outlet,
the valve seat includes
an annular elastic member that is made of an elastic body capable of abutting against the valve body,
an annular portion that covers an outer periphery of the elastic member,
an inner peripheral portion that is configured of a separate body from the annular portion and is disposed on an inner periphery of the elastic member, and
a detachment prevention portion that is provided in the inner peripheral portion on a valve body side to prevent the elastic member from detaching from the annular portion,
the method for manufacturing a pressure-reducing valve comprising:
a connecting step of connecting the annular portion and the inner peripheral portion by a connecting portion.

* * * * *